United States Patent
Lo

[11] Patent Number: 6,118,809
[45] Date of Patent: Sep. 12, 2000

[54] REPEATER DELAY BALANCING

[75] Inventor: William Lo, Santa Clara, Calif.

[73] Assignee: Advanced Micro Devices, Sunnyvale, Calif.

[21] Appl. No.: 08/791,587

[22] Filed: Jan. 31, 1997

[51] Int. Cl.[7] .................................................. H04B 3/36
[52] U.S. Cl. ........................... 375/211; 375/213; 370/402; 370/446; 370/502
[58] Field of Search ..................................... 375/211, 213; 370/445, 501, 447, 246, 392, 438, 402, 448, 124, 446, 502; 395/200.65

[56] References Cited

U.S. PATENT DOCUMENTS

| | | | |
|---|---|---|---|
| 5,265,123 | 11/1993 | Vijeh et al. ................................. | 375/3 |
| 5,293,375 | 3/1994 | Moorwood et al. ..................... | 370/124 |
| 5,384,767 | 1/1995 | Moorwood et al. ..................... | 370/13.1 |
| 5,430,762 | 7/1995 | Vijeh et al. .............................. | 375/211 |
| 5,600,651 | 2/1997 | Molle ....................................... | 370/448 |
| 5,648,959 | 7/1997 | Hyadis et al. ........................... | 370/445 |
| 5,740,174 | 4/1998 | Somer ..................................... | 370/402 |
| 5,771,235 | 6/1998 | Tang et al. .............................. | 370/446 |
| 5,850,525 | 12/1998 | Kalkunte et al. ................... | 395/200.65 |
| 5,936,962 | 8/1999 | Haddock et al. ....................... | 370/446 |

OTHER PUBLICATIONS

U.S. Patent application No. 08/791,180, pending, filed on Jan. 31, 1997, by William Lo, entitled "Signal Delays in a Logical Repeater Set".

*Primary Examiner*—Stephen Chin
*Assistant Examiner*—Shuwang Liu
*Attorney, Agent, or Firm*—Fliesler, Dubb, Meyer & Lovejoy LLP

[57] ABSTRACT

A repeater set provides for delaying a character of data that passes through the repeater set from one receive channel to a set of transmit channels. In providing for the delay of a character, the repeater set includes a delay calculator for calculating a character delay value. The repeater set then receives a character that is to be provided on a transmit channel and delays the character in a delay module for a period of time equal to the character delay value. The character delay value is determined by the delay calculator by first calculating a bit delay value and then converting the bit delay value into the character delay value.

18 Claims, 9 Drawing Sheets

REPEATER DELAY BALANCING

This patent application is related to and hereby incorporates by reference U.S. Patent Application, entitled SIGNAL DELAYS IN A LOGICAL REPEATER SET, by William Lo, U.S. patent application Ser. No. 08/791,180, pending, filed on Jan. 31, 1997.

BACKGROUND OF THE INVENTION

A. Field of Invention

The present invention generally relates to repeaters for use in a communications network. More particularly, the present invention is directed towards delaying the transmission of signals on a transmit channel of the repeater.

B. Description of Related Art

Figure 1:
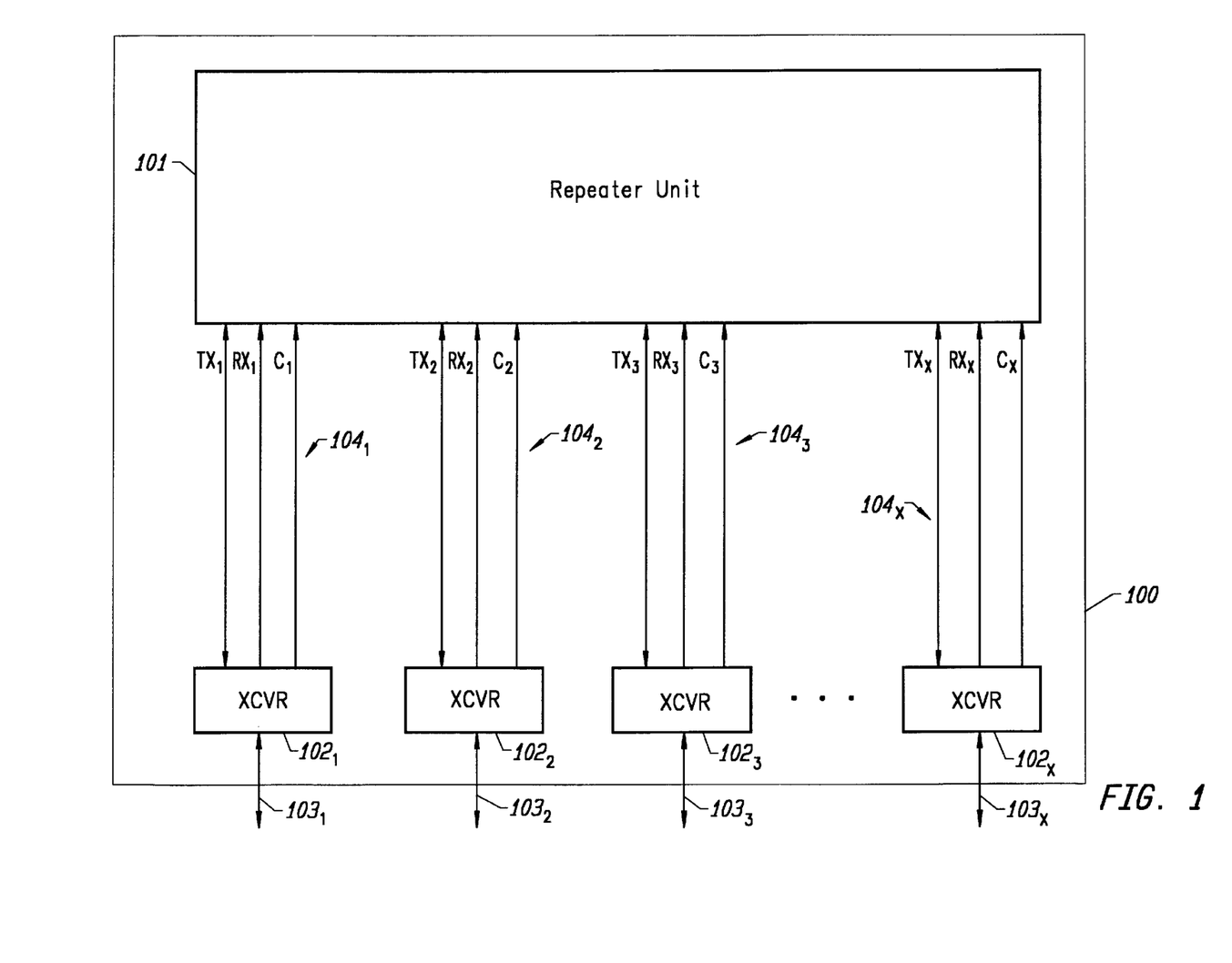
FIG. 1 illustrates a traditional repeater set.

FIG. 1 illustrates a traditional repeater set 100, including a repeater unit 101 and a set of transceivers $102_{1-X}$. A repeater set 100 as shown in FIG. 1 may be designed for use in a communications network that conforms to the Institute of Electrical and Electronics Engineers ("IEEE") 802.3u standard for a 100 Megabit per second ("Mb/s") Ethernet communications network. A specification for a repeater set 100 in an IEEE 802.3u communications network may be found in the *IEEE Standards for Local and Metropolitan Area Networks: Supplement to Carrier Sense Multiple Access with Collision Detection (CSMA/CD) Access Method and Physical Layer Specifications, Media Access Control (MAC) Parameters, Physical Layer, Medium Attachment Units, and Repeater for* 100 *Mb/s Operation, Type* 100*BASE-T* (*Clauses* 21–30), The Institute of Electrical and Electronics Engineers, Inc., 345 East 47th Street, New York, N.Y. 10017-2394, USA, 1995 ("IEEE 802.3u Standard"), which is hereby incorporated by reference.

Each transceiver $102_{1-X}$ may be coupled to a physical medium such as a cable or a bus for the purpose of transmitting data onto the physical medium and receiving data from the physical medium. Each transceiver may be coupled to a physical medium via a respective medium dependent interface ("MDI") $103_{1-X}$ that supports one of the physical signaling standards set forth in the IEEE 802.3u Standard.

Each transceiver $102_{1-X}$ also has a set of receive channel $RX_{1-X}$, transmit channel $TX_{1-X}$, and control $C_{1-X}$ signals that are coupled to the repeater unit 101. The transmit channel $TX_{1-X}$, receive channel $RX_{1-X}$, and control $C_{1-X}$ signals for each transceiver $102_{1-X}$ may conform to the medium independent interface ("MII") $104_{1-X}$ set forth in the IEEE 802.3u Standard or another suitable interface.

In operation, one of the transceivers $102_1$ begins receiving data from a physical medium via the MDI $103_1$. The transceiver $102_1$ then begins to provide the received data to the repeater unit 101 via the receive channel signals $RX_1$ on the MII $104_1$. The repeater unit 101 then transmits the data received from the first transceiver $102_1$ to all of the other transceivers $102_{2-X}$ coupled to the repeater unit 101.

The repeater unit 101 performs this transmission over the transmit channel $TX_{1-X}$ signals of each MII $104_{2-X}$. The transceivers $102_{2-X}$ then transmit the data received on their transmit channels $TX_{2-X}$ onto a respective physical medium via a respective MDI $103_{2-X}$. Each MDI $103_{1-X}$ may also be coupled to a piece of data terminal equipment ("DTE"), such as a computer, which sources information onto the MDI 103 and receives information from the MDI 103.

If more than one transceiver $102_{1-X}$ receives data on a MDI $103_{1-X}$ and provides the data to the repeater unit 101 on a receive channel $RX_{1-X}$, the repeater unit 101 identifies that a collision is taking place. In response to detecting the collision, the repeater unit 101 causes a JAM message to be transmitted onto each MDI $103_{1-X}$. This may be achieved by providing a JAM message on the transmit channel $TX_{1-X}$ that is coupled to each of the transceivers $102_{1-X}$. Each transceiver $102_{1-X}$ then propagates the JAM message onto a respective physical medium via the MDI $103_{1-X}$.

The IEEE 802.3u Standard specifies two classes of repeaters. Class I repeaters are defined as being:

A type of repeater set specified such that in a maximum length segment topology, only one such repeater set may exist between any two DTE's within a single collision domain. IEEE 802.3u Standard, Clause 27.1.1.3.

Class II repeaters are defined as being:

A type of repeater set specified such that in a maximum length segment topology, only two such repeater sets may exist between any two DTE's within a single collision domain. IEEE 802.3u Standard, Clause 27.1.1.3.

The IEEE 802.3u Standard also defines the following parameters for a repeater set 100:

Start-of-Packet Propagation Delay ("SOP"): The delay between the start of a packet of data being received on a receiving transceiver's MDI to the start of the packet of data being transmitted on a transmitting transceiver's MDI. IEEE 802.3u Standard, Clause 27.3.1.3.3.

Start-of-Collision JAM Propagation Delay ("SOJ"): The time delay between the start of the second packet in a collision arriving at the MDI of a transceiver and the start of the JAM message being transmitted onto the MDI of all transceivers. IEEE 802.3u Standard, Clause 27.3.1.4.3.

Cessation-of-Collision JAM Propagation Delay ("EOJ"): The time delay between the end of a packet, which causes the repeater unit to cause the JAM message to no longer be transmitted by a transceiver, and the JAM no longer being transmitted on the MDI of the transceiver. IEEE 802.3u Standard, Clause 27.3.1.4.4.

For Class I repeaters, the sum of SOP and SOJ must not exceed 140 bit times, in order to comply with the IEEE 802.3u Standard. For Class II repeaters, the IEEE 802.3u Standard requires that the sum of SOP and SOJ must not exceed 67 bit times when the physical medium is 100BASE-T4 type. For Class II repeaters, the IEEE 802.3u Standard requires that neither SOP nor SOJ exceed 46 bit times in 100BASE-TX and 100BASE-FX physical medium types.

For both Class I and Class II repeater sets, such as repeater set 100, the IEEE 802.3u standard specifies that EOJ be less than or equal to SOP for each port in the repeater set. This requirement assures that the end of a collision JAM message is propagated to all DTE's on a communications network before a new packet of data is received by a DTE on the communications network. This prevents the new packet of data from merging with the JAM message and being corrupted.

Accordingly, it is desirable to have a mechanism for use with a repeater set that allows for balancing the SOP and EOJ delay parameters so that EOJ is less than or equal to SOP for each port of the repeater set.

SUMMARY OF THE INVENTION

The present invention provides for the balancing of the SOP and EOJ parameters in a repeater set, so that EOJ is less than or equal to SOP for each port of the repeater set.

In order to perform such an operation, the repeater provides for delaying a character of data that passes through the repeater set from one receive channel to a set of transmit channels. The repeater includes a repeater unit that is coupled to a plurality of transceivers. Each transceiver includes a receive channel that is coupled to the repeater unit and a transmit channel that is coupled to the repeater unit.

In providing for the delay of data characters, the repeater set includes a delay calculator for calculating a character delay value. The repeater set receives a character that is to be provided on a transmit channel and delays the character for a period of time equal to the character delay value in a delay module. The character delay value is determined by the delay calculator which first calculates a bit delay value and then converts the bit delay value into a character delay value.

BRIEF DESCRIPTION OF THE DRAWINGS

Further details of the present invention are explained with the help of the attached drawings in which.

DETAILED DESCRIPTION

In order for a repeater set to comply with the IEEE 802.3u standard, the EOJ must be less than or equal to the SOP for each port of the repeater set, regardless of which transceiver is supplying data to the repeater set. For example, the EOJ for a first port of the repeater set must be less than or equal to an SOP for data being transmitted out of the first port, regardless of which port is providing data to the repeater unit.

Figure 2:
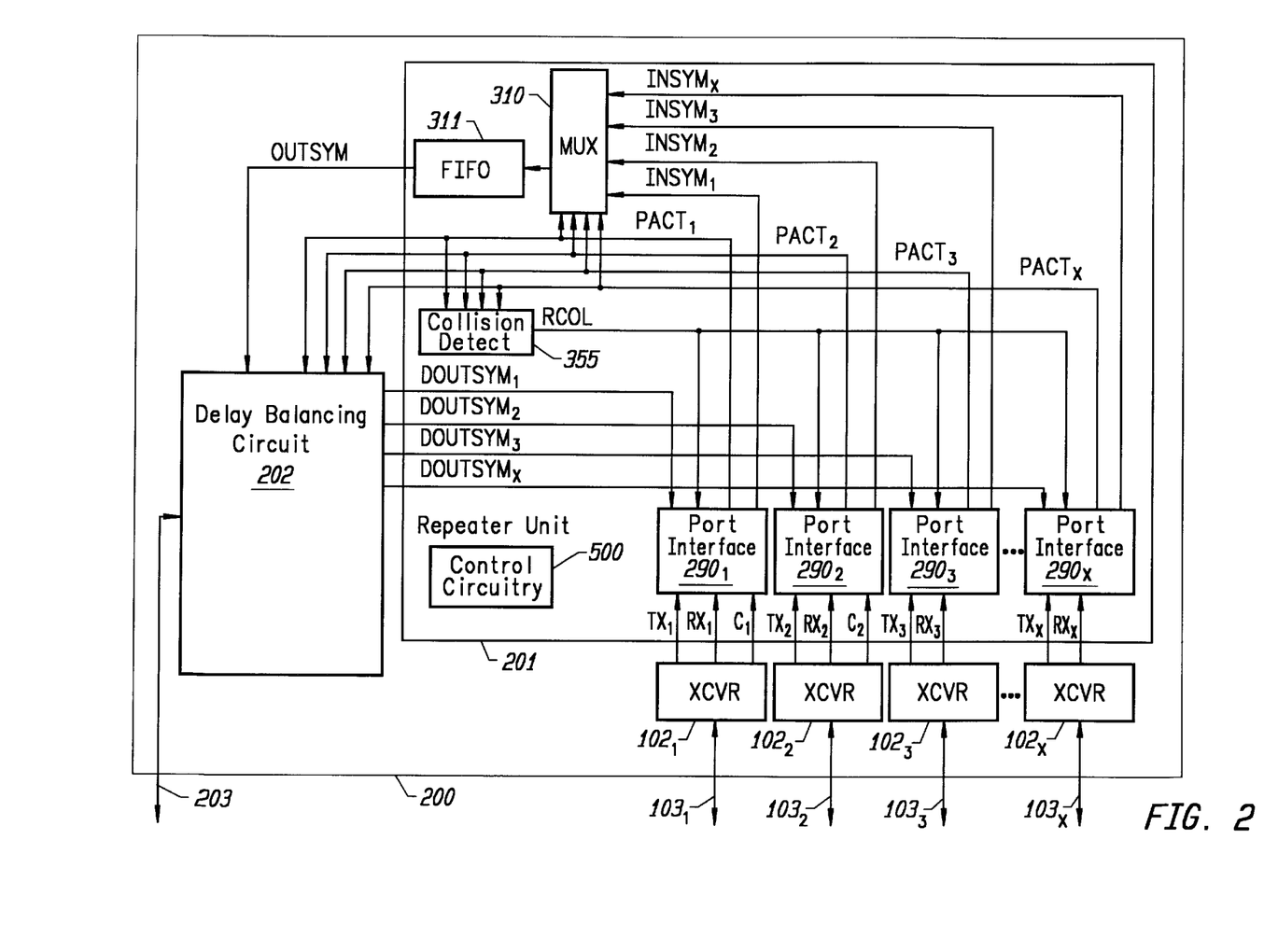
FIG. 2 illustrates a repeater set, including a delay balancing circuit, in accordance with the present invention.

FIG. 2 illustrates a repeater set 200, in accordance with the present invention. The repeater set 200 includes a set of transceivers $102_{1-X}$ that are coupled to a repeater unit 201, which is coupled to a delay balancing circuit 202. The delay balancing circuit 202 provides for establishing a temporal relationship between the EOJ and SOP for each port of the repeater set, so that EOJ is less than or equal to SOP for each port in the repeater set 200.

Both the SOP and EOJ for each port may be broken down into smaller components. The SOP for a port of a traditional repeater set 100 may be calculated as follows:

SOP=SOP(rx)+SOP(tx)+SOP(ru)

wherein:

SOP(rx) is the portion of the SOP that is contributed by a transceiver, which is providing data to the repeater unit;

SOP(tx) is the portion of the SOP that is contributed by a transceiver, which is transmitting data out of the repeater set; and SOP(ru) is the portion of the SOP that is contributed by the repeater unit.

Both SOP(rx) and SOP(tx) are unique to each transceiver. SOP(ru) may be the same for all the SOP calculations relating to ports in a repeater set that are controlled by the same repeater unit.

In accordance with the present invention, SOP for each port may be calculated as follows:

SOP=SOP(rx)+SOP(tx)+SOP(ru)+CDV wherein:

CDV is a character delay value calculated by the delay balancing circuit, which provides for the EOJ of the port to be less than or equal to the SOP of the port.

The EOJ for each port in both a traditional repeater set 100, as well as a repeater set 200 in accordance with the present, may be calculated as follows:

EOJ=EOJ(rx)+EOJ(tx)+EOJ(ru)

wherein:

EOJ(rx) is the portion of the EOJ that is contributed by a transceiver, which is providing data to the repeater unit;

EOJ(tx) is the portion of the EOJ that is contributed by a transceiver, which is transmitting data out of the repeater set; and EOJ(ru) is the portion of the EOJ that is contributed by the repeater unit.

Both EOJ(rx) and EOJ(tx) are unique to each transceiver. EOJ(ru) may be the same for all EOJ calculations for the ports in a repeater set that are controlled by the same repeater unit.

A unique character delay value may be calculated for each port's transmit channel. The character delay value for each port indicates the period of time for which a data character should be delayed in the repeater set 200 to provide for EOJ being less than or equal to SOP for the port.

A character is then received by the delay balancing circuit 202 and delayed for each transmit channel, for a time period equal to a respective one of the character delay values. The delay of a character may be achieved by storing the character in a register for the character delay value period of time. Next, the delay balancing circuit 202 provides each delayed character to the repeater unit 201 for transmission on a respective transmit channel.

One method of calculating a character delay value is to first calculate a bit delay value and then convert the bit delay value into a character delay value. A bit delay value indicates the period of time that each bit in a data character on a port should be delayed in the repeater set 200, so that EOJ is less than or equal to SOP for the port. The bit delay value is then converted into a character delay value.

A bit delay value may be calculated for each one of the transmit channels in the repeater set 200, according to the following equation:

BDV=MAX_EOJ_R−SOP(rx)+MAX_EOJ_T−SOP(tx)+EOJ(ru)−SOP(ru) if

MAX_EOJ_R−SOP(rx)+MAX_EOJ_T−SOP(tx)+EOJ(ru)−SOP(ru) is greater than 0, else BDV=0     Equation 1 wherein:

BDV is the bit delay value for the port transmitting data out of the repeater set 200 through a transceiver having a transmit channel SOP of SOP(tx);

MAX_EOJ_R is a value equal to the largest EOJ(rx) value possessed by any of the transceivers $102_{1-X}$ in the repeater set 200;

SOP(rx) is a value equal to the a SOP value of a receive channel of a transceiver $102_{1-X}$ in the repeater set 200 that is providing information to the repeater unit 201;

MAX_EOJ_T is a value equal to the largest EOJ(tx) value possessed by any of the transceivers $102_{1-X}$ in the repeater set 200;

SOP(tx) is a SOP value of a transmit channel in the transceiver 102 of the repeater set port for which BDV is being calculated;

EOJ(ru) is the EOJ value for the repeater unit 201; and

SOP(ru) is the SOP value for the repeater unit 201.

The bit delay value ("BDV") may be expressed in many different types of measurements. In one embodiment of the present invention, BDV is expressed in number of bit times, where a bit time is a period of time required to transmit one bit of the character on a physical medium.

Each bit delay value is converted, into a character delay value for the port, according to the following equation:

$$CDV=INT[BDV/B], \text{ if } INT[BDV/B] \text{ is less than or equal to Q, else} \\ CDV=Q. \quad \text{Equation 2}$$

wherein:

CDV is the character delay value;

B is the number of data bits representing the character that is being delayed;

INT[BDV/B] is equal to the quotient of BDV divided by B, if the quotient is an integer, else INT[BDV/B] is equal to the integer portion of the quotient plus 1; and Q is a maximum allowable number of delay periods.

In accordance with the present invention, a delay period may be equal to any period of time. In one embodiment of the present invention, the delay period is equal to one character time, which is a period of time required to transmit one character on a physical medium. In one embodiment of the present invention characters in a data packet are transmitted at a frequency of 25 MHz.

In one embodiment of the present invention, B is equal to 4 and Q is equal to 15. In an alternate embodiments of the present invention, there may be no maximum allowable number of delay periods, in which case the following equation is used to convert the bit delay value into the character delay value:

$$CDV=INT[BDV/B]. \quad \text{Equation 3}$$

However, compliance with the IEEE 802.3u Standard requires that the character delay value be set so that the maximum bit time delays for SOP and SOJ are not violated. If the present invention is being employed in a repeater set that is not fully compliant with the IEEE 802.3u Standard, then the requirements for maximum SOP and SOJ values may be disregarded.

As shown in FIG. 2, the repeater set 200 includes the transceivers $102_{1-X}$ depicted in FIG. 1 and a repeater unit 201, which conforms to the IEEE 802.3u standard. The repeater unit 201, transceivers $102_{1-X}$, and medium dependent interfaces $103_{1-X}$ may be coupled and operate the same as described in FIG. 1, with the additions set forth below in this Detailed Description.

In accordance with the present invention, a transceiver 102 may have a receive channel RX, a set of control signals C, and a transmit channel TX coupled to the repeater unit 201. In one embodiment of the present invention, the receive channel, control signals and transmit channel may be coupled to the repeater unit 201 in conformance with the MII specified in the IEEE 802.3u Standard. An MII receive channel RX includes the following signals:

Receive Clock ("RX-CLK"): A continuous clock provided by the transceiver that provides the timing reference for RX_DV, RXD, and RX_ER;

Receive Data ("RXD<3:0>"): A set of four bits sourced by the transceiver to the repeater unit 201 synchronously with respect to RX_CLK to reflect data received on the transceiver's MDI; and Receive Error ("RX_ER"): A signal provided by the transceiver that is asserted to indicate that an error was detected in the frame being transferred on the receive channel.

A set of MII control signals C includes the following signals:

Receive Data Valid ("RX_DV"): A signal sourced by the transceiver to the repeater unit 201 synchronously with respect to RX_CLK to indicate that valid data is being sourced on RXD<3:0>;

Carrier Sense ("CRS"): A signal asserted by the transceiver when the physical medium attached to the transceiver is not idle. CRS may be asserted when the transceiver is either receiving data or transmitting data; and Collision ("COL"): A signal that is asserted by the transceiver 102 upon detecting that a collision has occurred, such as when the transmit channel and receive channel are both active.

A MII transmit channel TX includes the following signals:

Transmit Clock ("TX_CLK"): A continuous clock sourced by the transceiver to the repeater unit 201 that provides a timing reference for the TX_EN, TXD, and TX_ER signals;

Transmit Data ("TXD<3:0>"): A set of four data bits sourced by the repeater unit 201 synchronously with respect to TX_CLK. The data on TXD<3:0> is transmitted onto the transceiver's MDI when TX_EN is asserted and ignored by the transceiver when TX_EN is deasserted;

Transmit Enable ("TX_EN"): A signal sourced by the repeater unit 201 synchronously with respect to TX_CLK to indicate that data is being provided on the TXD; and Transmit Coding Error ("TX_ER"): A signal asserted by the repeater unit 201 to instruct the transceiver to transmit a character within the data frame on the transceiver's transit channel that is not part of the data being provided on the transmit channel.

Alternatively, a transceiver may include only a receive channel RX and a transmit channel TX that are coupled to the repeater unit 201. The control information is encoded into the data provided by the transceiver 102 on the receive channel and the data provided by the repeater unit 201 on the transmit channel. In such an embodiment, the receive channel RX may only include a set of receive data signals ("RXD") and a receive clock ("RX_CLK"). Similarly, the transmit channel TX may only include a set of transmit data signals ("TXD") and a transmit clock ("TX_CLK") In one embodiment of the present invention, transceivers $102_1$ and $102_2$ are coupled to the repeater unit 201 in accordance with the MII specified in the IEEE 802.3u Standard. Transceivers $102_3$ and $102_X$ are coupled to the repeater unit 201 in accordance with the alternate receive channel and transmit channel described above. In alternate embodiments of the present invention, the ports may conform to yet another interface including receive channels and transmit channels. Each type of port channel interfaces may appear on none, all or any different combination of the repeater set's ports.

The repeater unit 201 includes a set of port interfaces $290_{1-X}$. Each port interface provides an interface to the transmit channel, receive channel, and control signals, if any, of a respective one of the transceivers $102_{1-X}$.

Figure 3:
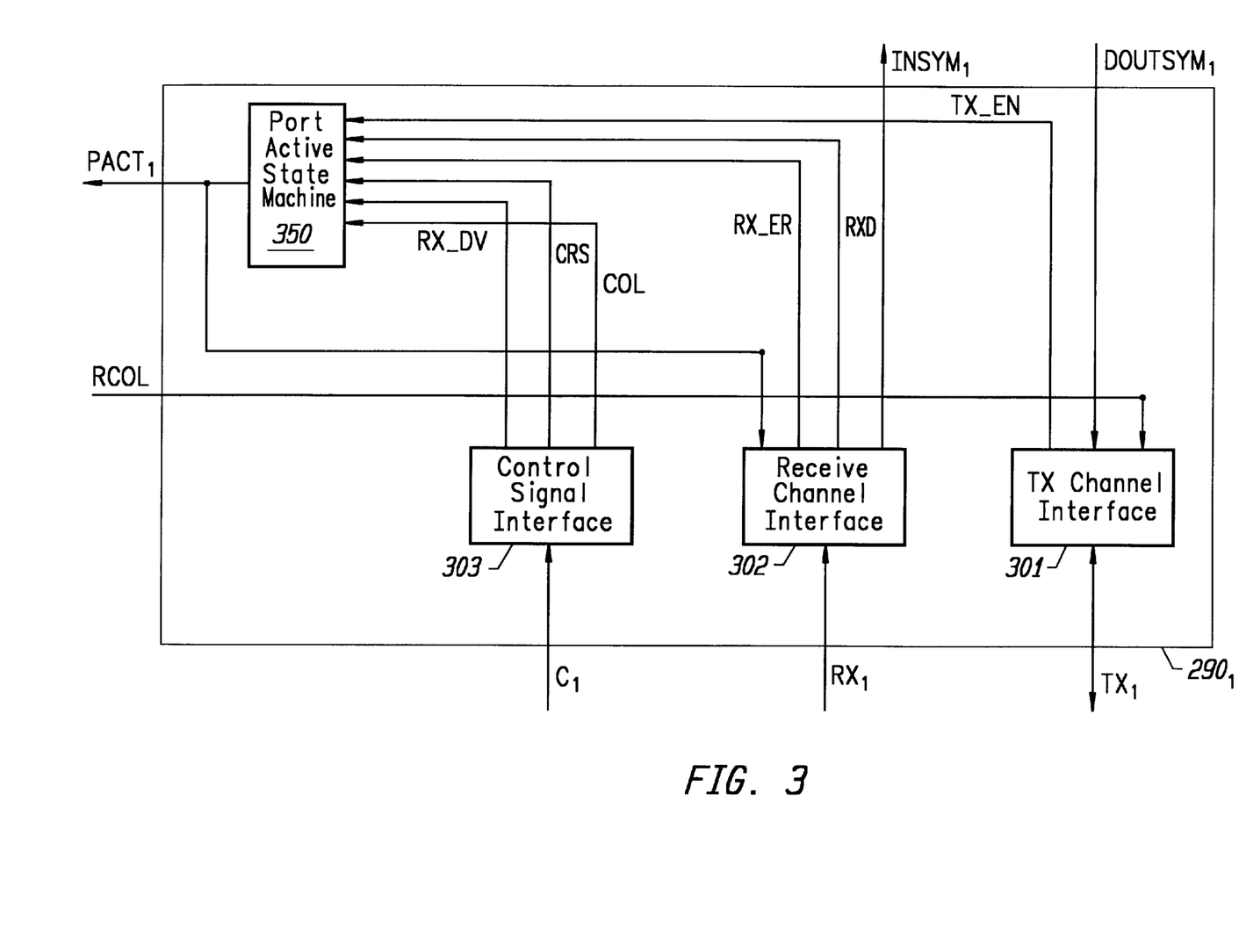
FIG. 3 illustrates a port interface in the repeater set shown in FIG. 2 for interfacing to an MII port.

FIG. 3 illustrates a port interface $290_1$ that is employed when the port has an MII interface. Port interface $290_1$ includes an MII transmit channel interface 301, MII receive channel interface 302, and MII control signal interface 303. The MII transmit interface 301 is coupled to the MII transmit channel $TX_1$; the MII receive channel interface 302 is coupled to the MII receive channel $RX_1$, and the MII control signal interface 303 is coupled to the MII control signals $C_1$.

The MII receive channel interface 302 is also coupled to receive the output of a port active state machine 350 (described in greater detail below) to determine when the receive channel is active. The receive channel interface 302 converts the signals that are received on the MII receive channel $RX_1$ into an internal set of receive data signals, which is labeled as $INSYM_1$.

In accordance with the present invention, the MII receive channel signals may be encoded to form a five bit INSYM<4:0> signal. Table I below illustrates an encoding scheme that may be employed.

TABLE I

| ENTRY | INSYM | MII RXD | DESCRIPTION |
|---|---|---|---|
| 1 | 11110 | 0000 | Data 0 |
| 2 | 01001 | 0001 | Data 1 |
| 3 | 10100 | 0010 | Data 2 |
| 4 | 10101 | 0011 | Data 3 |
| 5 | 01010 | 0100 | Data 4 |
| 6 | 01011 | 0101 | Data 5 |
| 7 | 01110 | 0110 | Data 6 |
| 8 | 01111 | 0111 | Data 7 |
| 9 | 10010 | 1000 | Data 8 |
| 10 | 10011 | 1001 | Data 9 |
| 11 | 10110 | 1010 | Data A |
| 12 | 10111 | 1011 | Data B |
| 13 | 11010 | 1100 | Data C |
| 14 | 11011 | 1101 | Data D |
| 15 | 11100 | 1110 | Data E |
| 16 | 11101 | 1111 | Data F |
| 17 | 11111 | Undefined | Idle |

The INSYM column indicates the value to be placed on the INSYM set of signals. The MII RXD column indicates the value on the set of MII receive data signals RXD<3:0> for the corresponding INSYM value. The Description column indicates the interpretation of the INSYM signal.

For example, in the first table entry, INSYM is 11110, and the RXD value is 0000. The Description indicates that INSYM is interpreted by the repeater set 201 to indicate that a data value of zero is being provided on the MII's RXD signals. The first sixteen entries in Table I address the proper encoding of data values provided on the MII's receive data signals, once it is detected that the MII port is active. An assertion of the port active state machine's output PACT, indicates that the MII port's receive channel RX is active.

Entry 17 in Table I indicates that INSYM is set to a value of 11111 when the MII receive channel is not active, thereby indicating that the MII receive channel is idle. Other values of INSYM<4:0> than those listed in Table I may be employed to indicate different occurrences on the receive channel.

The transmit channel interface 301 converts an internal data signal $DOUTSYM_1$ into a set of MII transmit channel signals. In accordance with the present invention, $DOUTSYM_1$ may be a 5 bit signal DOUTSYM<4:0>. Table II illustrates an encoding scheme that may be employed by the transmit channel interface 301.

TABLE II

DOUTSYM DECODING

| ENTRY | DOUTSYM | MII TXD | DESCRIPTION |
|---|---|---|---|
| 1 | 11110 | 0000 | Data 0 |
| 2 | 01001 | 0001 | Data 1 |
| 3 | 10100 | 0010 | Data 2 |
| 4 | 10101 | 0011 | Data 3 |
| 5 | 01010 | 0100 | Data 4 |
| 6 | 01011 | 0101 | Data 5 |
| 7 | 01110 | 0110 | Data 6 |
| 8 | 01111 | 0111 | Data 7 |
| 9 | 10010 | 1000 | Data 8 |
| 10 | 10011 | 1001 | Data 9 |
| 11 | 10110 | 1010 | Data A |
| 12 | 10111 | 1011 | Data B |
| 13 | 11010 | 1100 | Data C |
| 14 | 11011 | 1101 | Data D |
| 15 | 11100 | 1110 | Data E |
| 16 | 11101 | 1111 | Data F |
| 17 | 11111 | undefined | Idle |
| 18 | 11000 | 0101 | Start-of-Stream Delimiter, Part 1 of 2. |
| 19 | 10001 | 0101 | Start-of-Stream Delimiter, Part 2 of 2. |
| 20 | 01101 | undefined | End-of-Stream Delimiter; Part 1 of 2. |
| 21 | 00111 | undefined | End-of-Stream Delimiter, Part 2 of 2. |
| 22 | 00100 | undefined | Transmit Error |

The DOUTSYM column indicates the value of each bit in the DOUTSYM signal. The MII TXD column indicates the value of the MII transmit data TXD for a corresponding DOUTSYM value. The Description column indicates the interpretation of the DOUTSYM signal.

For example, in the first table entry DOUTSYM is 11110, and the TXD value is 0000. The Description indicates that the DOUTSYM is interpreted by the repeater set 201 to indicate that a data value of zero is to be provided on the MII's TXD signals. The first sixteen entries in Table II address the proper decoding of data values to be provided on the MII's transmit data signals during a transmission. In the case of any one of these 16 entries, the MII transmit enable TX_EN is asserted by the transmit channel interface 301.

Entry 17 in Table II indicates that the DOUTSYM signal is set to a value of 11111 when the MII transmit data signals are not to be provided with data from the repeater unit 201, thereby indicating that the MII transmit channel is to be idle. When the transmit channel is IDLE, MII transmit enable TX_EN is deasserted. Entries 18 and 19 in Table II show values of DOUTSYM, which upon being sequentially transmitted, indicate that a data frame is to begin being provided to the transmit channel. Accordingly, the value 0101 is provided to the MII transmit data signals TXD and the MII transmit enable TX_EN is asserted, until an end of the frame is indicated.

Entries 20 and 21 indicate values of DOUTSYM that signal the end of a data frame upon being provided to the transmit channel interface 301 sequentially. In response, the MII transmit enable signal is deasserted. Entry 22 in Table II shows that when DOUTSYM equals 00100 a transmit error condition is to be communicated to the MII transmit channel. Accordingly, the transmit interface 301 asserts the MII transmit error signal.

As stated above, each port interface 290 for an MII also includes a port active state machine 350 for determining when a port in the repeater set 200 is providing data to the repeater unit 201. The port active state machine 350 asserts the PACT signal to indicate the beginning of such activity and does not deassert the PACT signal until the port's transmit and receive channels are idle.

The port active state machine 350 receives the TX_EN signal from the transmit channel interface 301, the RX_ER and RXD signals from the receive channel interface 302, and the COL, CRS, and RX_DV signals from the control signal interface 303.

Figure 4:
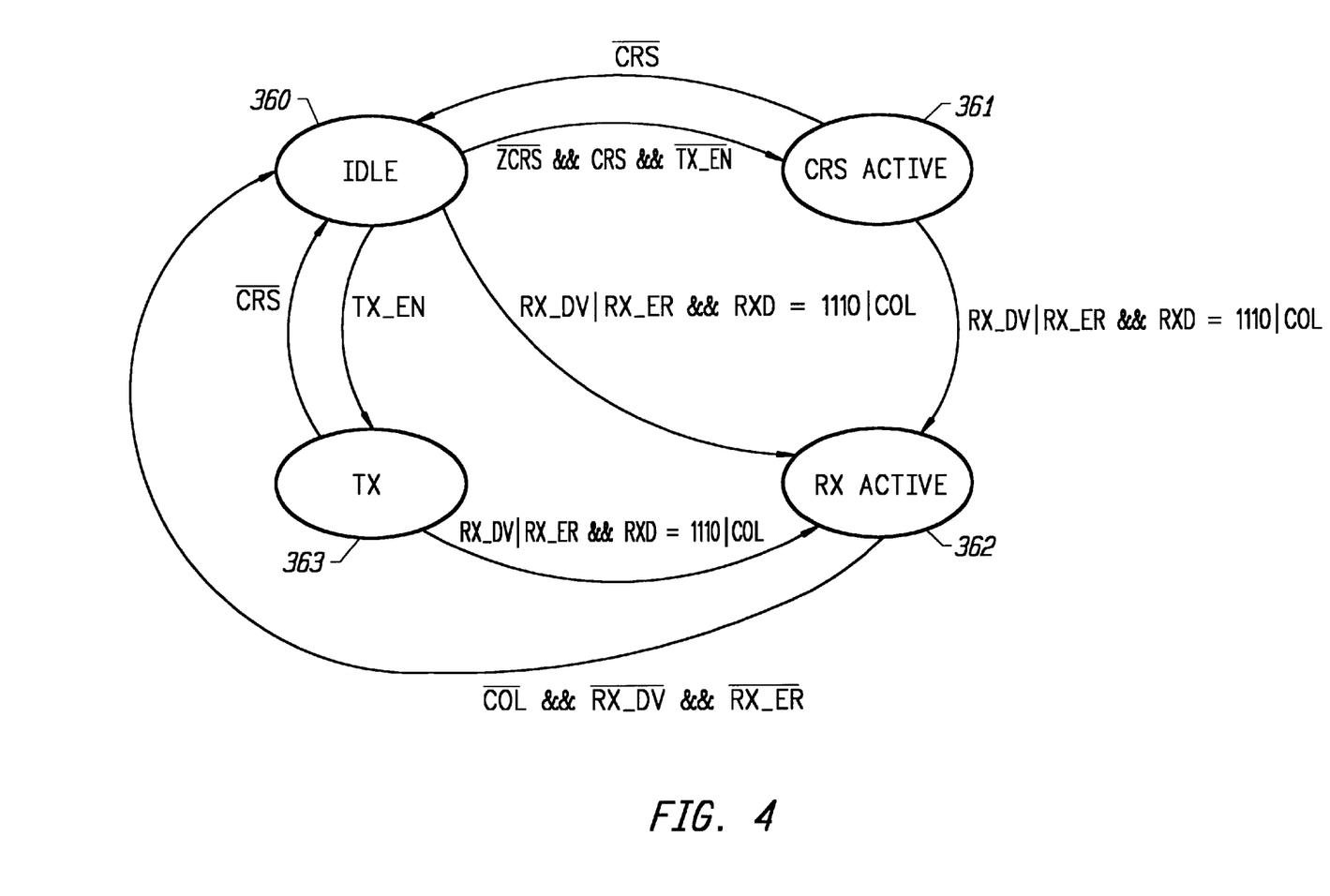
FIG. 4 illustrates a port active state machine in the port interface shown in FIG. 3.

FIG. 4 illustrates one possible state diagram for such a port active state machine 350. The state machine in FIG. 4 may be implemented as a synchronous state machine that transitions synchronously with the port's transmit clock signal TX_CLK, receive clock signal RX_CLK, or another clock. Alternatively, the port active state machine 350 may be implemented asynchronously.

Upon being powered up, the port active state machine 350 transitions to an IDLE state 360. In the IDLE state 360, the output PACT of the port state machine 350 is deasserted to indicate that the MII receive channel is not active. The output of each port state machine 350 in the repeater unit 201 is coupled to the delay balancing circuit 202 and a collision detection circuit 355 (FIG. 2). The collision detection circuit asserts a repeater collision signal RCOL to each port interface $290_{1-X}$ when more than one ports is determined to be providing data to the repeater unit 201. The repeater collision signal RCOL remains asserted until each port in the repeater set 201 is idle.

The state machine 350 transitions from the IDLE state 360 to a CRS ACTIVE state 361 when the carrier sense signal CRS is asserted, and was deasserted in the previous state machine clock period (/ZCRS), and the transmit enable signal TX_EN on the MII port is not asserted. In the CRS ACTIVE state 361, the state machine 350 output PACT is asserted to indicate that the MII receive channel is active. When the state machine 350 is in the IDLE state 360 and the receive data valid signal RX_DV is asserted or the port's collision signal COL is asserted or both a receive error is detected and the RXD signal has a value of 1110, the state machine 350 transitions to a RX ACTIVE state 362. In the RX ACTIVE state 362, the output PACT of the state machine 350 is asserted. When the state machine 350 is in the IDLE state 360 and the transmit enable signal TX_EN for the port is asserted, the state machine 350 transitions to a TX state 363. In the TX state 363, the output of the state machine 350 is deasserted. Otherwise, the state machine 350 remains in the IDLE state 360.

The state machine 350 transitions from the CRS ACTIVE state 361 to the IDLE state 360 when the port's carrier sense signal CRS is deasserted. The state machine 350 transitions from the CRS ACTIVE state 361 to the RX ACTIVE state 362 under the same conditions that the state machine 350 transitions from the IDLE state 360 to the RX ACTIVE state 362. Otherwise, the state machine 350 remains in the CRS ACTIVE state 361.

The state machine 350 transitions from the RX ACTIVE state 362 to the IDLE state 360 when the port's collision signal COL is deasserted and the port's receive data valid signal RX_DV is deasserted and the port's receive error signal RX_ER is deasserted. Otherwise, the state machine 350 remains in the RX ACTIVE state 362.

The state machine 350 transitions from the TX state 363 to the RX ACTIVE state 362 under the same conditions that the state machine 350 transitions from the IDLE state 360 to the RX ACTIVE state 362. The state machine 350 transition from the TX state 363 to the IDLE state 360 when the port's carrier sense signal CRS is deasserted. Otherwise, the state machine 350 remains in the TX state 363.

Figure 5:
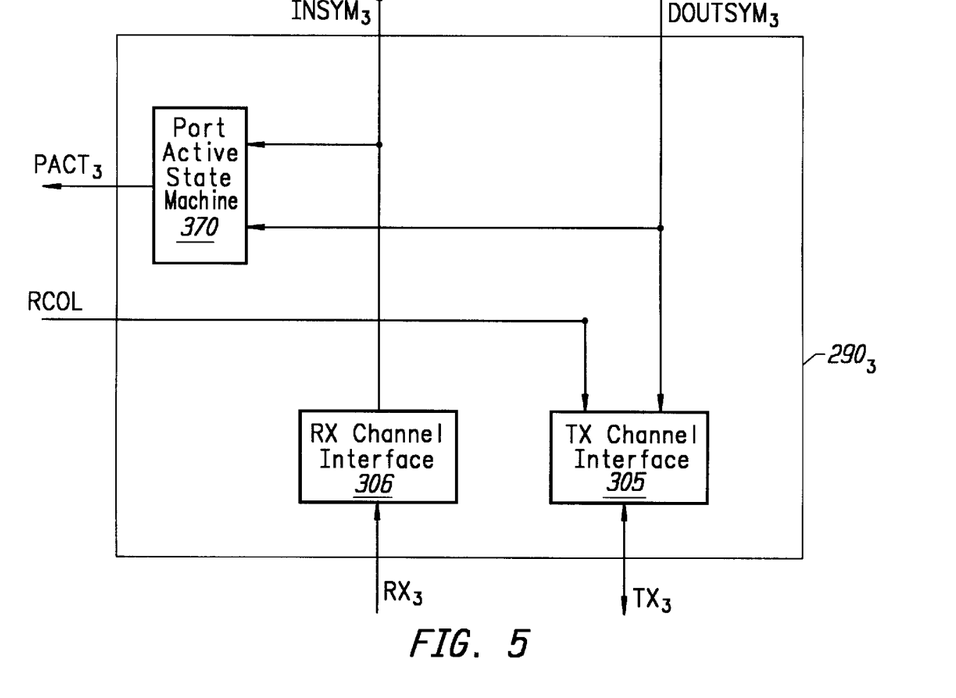
FIG. 5 illustrates a port interface in the repeater set shown in FIG. 2 for interfacing to a non-MII port.

As described above, a repeater port may alternatively include only a set of transmit and receive data signals and a transmit and receive clock. A port interface $290_3$ to such a port in shown in FIG. 5. The port interface $290_3$ may include a transmit channel interface 305 and receive channel interface 306, but not a control signal interface. The values received from the port's receive channel $RX_3$ are the INSYM values, and the receive channel interface 306 does not have to perform any encoding. The values provided to the transmit channel by the repeater unit 201 are the DOUTSYM$_3$ values, and the transmit channel interface 305 does not have to perform any decoding.

Figure 6:
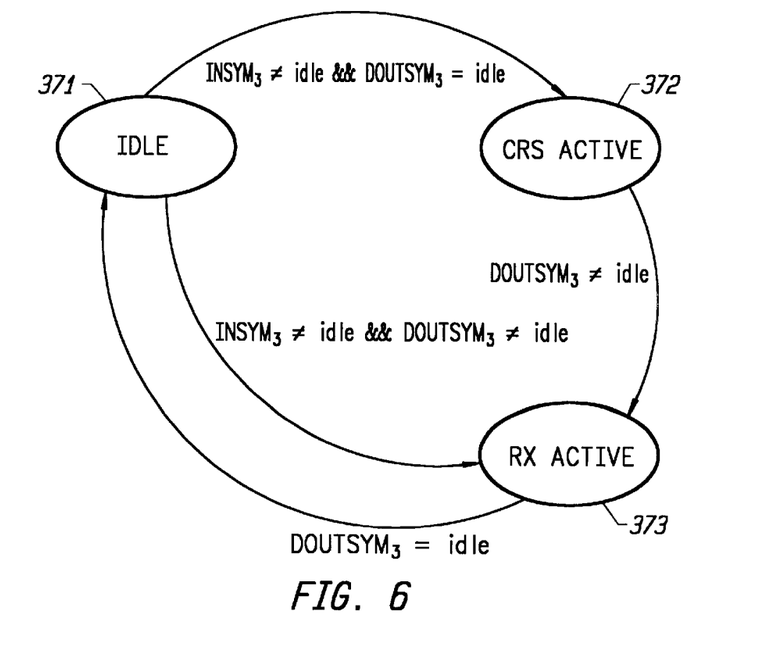
FIG. 6 illustrates a port active state machine in the port interface shown in FIG. 5.

FIG. 6 illustrates a state diagram for a port active state machine 370 to be employed in a port interface $290_3$ that interfaces to a port having a receive channel employing INSYM signals and a transmit channel employing DOUTSYM signals. The state machine 350 in FIG. 7 may be implemented as a synchronous state machine that transitions synchronously with the port's transmit clock signal, receive clock signal, or another clock. Alternatively, the state machine 370 may be asynchronous. The port active state machine 370 in FIG. receives both the INSYM$_3$ and DOUTSYM$_3$ signals.

Upon being power up, the port active state machine 350 transitions to an IDLE state 371. In the IDLE state 371, the output PACT of the port state machine 370 is deasserted to indicate that the port's receive channel is not active. The output of the port state machine 370 is coupled to the collision detection circuit 355 and the delay balancing circuit 202.

The state machine 350 transitions from the IDLE state 371 to a CRS ACTIVE state 372 when the INSYM$_3$ signal indicates that the receive channel RX$_3$ is not idle and the DOUTSYM$_3$ signal indicates that the transmit channel is to be idle. In the CRS ACTIVE state 372, the state machine 370 output PACT is asserted to indicate that the receive channel is active. When the state machine 370 is in the IDLE state 371 and the INSYM$_3$ signal indicates that the receive channel is not idle and the DOUTSYM$_3$ signal does not indicate that the transmit channel is to be idle, the state machine 350 transitions to a RX ACTIVE state 373. In the RX ACTIVE state 373, the output PACT of the state machine 370 is asserted. Otherwise, the state machine 370 remains in the IDLE state 371.

The state machine 370 transitions from the CRS ACTIVE state 372 to the RX ACTIVE state 373 when the DOUTSYM$_3$ signal does not indicate that the transmit channel is to be idle. Otherwise, the state machine 350 remains in the CRS ACTIVE state 372. The state machine 370 transitions from the RX ACTIVE state 373 to the IDLE state 371 when the DOUTSYM$_3$ signal indicates that the transmit channel is to be idle. Otherwise, the state machine 370 remains in the RX ACTIVE state 373.

In response to the repeater collision signal RCOL being asserted, each port interface $290_{1-X}$ immediately causes a JAM message to be transmitted to a respective one of the transmit channels $TX_{1-X}$. In each port interface $290_{1-X}$, the transmit channel interface 301, 305 ceases to drive its respective transmit channel in response to DOUTSYM and begins providing the JAM message to the transmit channel. This allows for the character delay provided by the delay balancing circuit 202 to not be employed when a collision JAM message is being transmitted onto a transmit channel. This minimizes the EOJ and SOP values for the repeater set 200.

In the repeater unit 201 in FIG. 2, each INSYM set of signals INSYM$_{1-X}$ is provided to a respective input of a port multiplexer 310. The output PACT$_{1-X}$ of each port active state machine is provided to a respective select signal on the port multiplexer 310. As a result, when the output PACT$_{1-X}$ of a port active state machine is asserted, the corresponding INSYM$_{1-X}$ signal is provided at the port multiplexer's output.

The port multiplexer's output is coupled to the input of a first out first in memory ("FIFO") 311. The FIFO provides an internally synchronized version of the selected INSYM signal at its output. The output of the FIFO is labeled as OUTSYM and is coupled to the delay balancing circuit 202. The delay balancing circuit 202 delays the OUTSYM signal uniquely for each port to provide for the EOJ to be less than or equal to the SOP for each port. A respective one of the delayed OUTSYM signals DOUTSYM$_{1-X}$ is provided to each port interface 290$_{1-X}$ by the delay balancing circuit 202.

A user interface bus 203, including data, address, and control signals, is also coupled to the delay balancing circuit 202. The user interface 203 enables a user of the repeater set 200 to program the delay balancing circuit 202 with values, which will be described in greater detail below. One with ordinary skill in the art will recognize that the user interface bus 203 may be implemented by employing a traditional bus for enabling the loading of data storage elements, such as memory or registers, within the delay balancing circuit 202.

The repeater unit 201 also includes a block of control circuitry 500. The control circuitry 500 provides for ensuring that the repeater unit 201 performs other operations in conformance with the operational requirements and state diagrams set forth in the IEEE 802.3u Standard. The control circuitry 500 is coupled (not shown) to the other circuitry in the repeater unit 201 to perform its functions.

Figure 7:
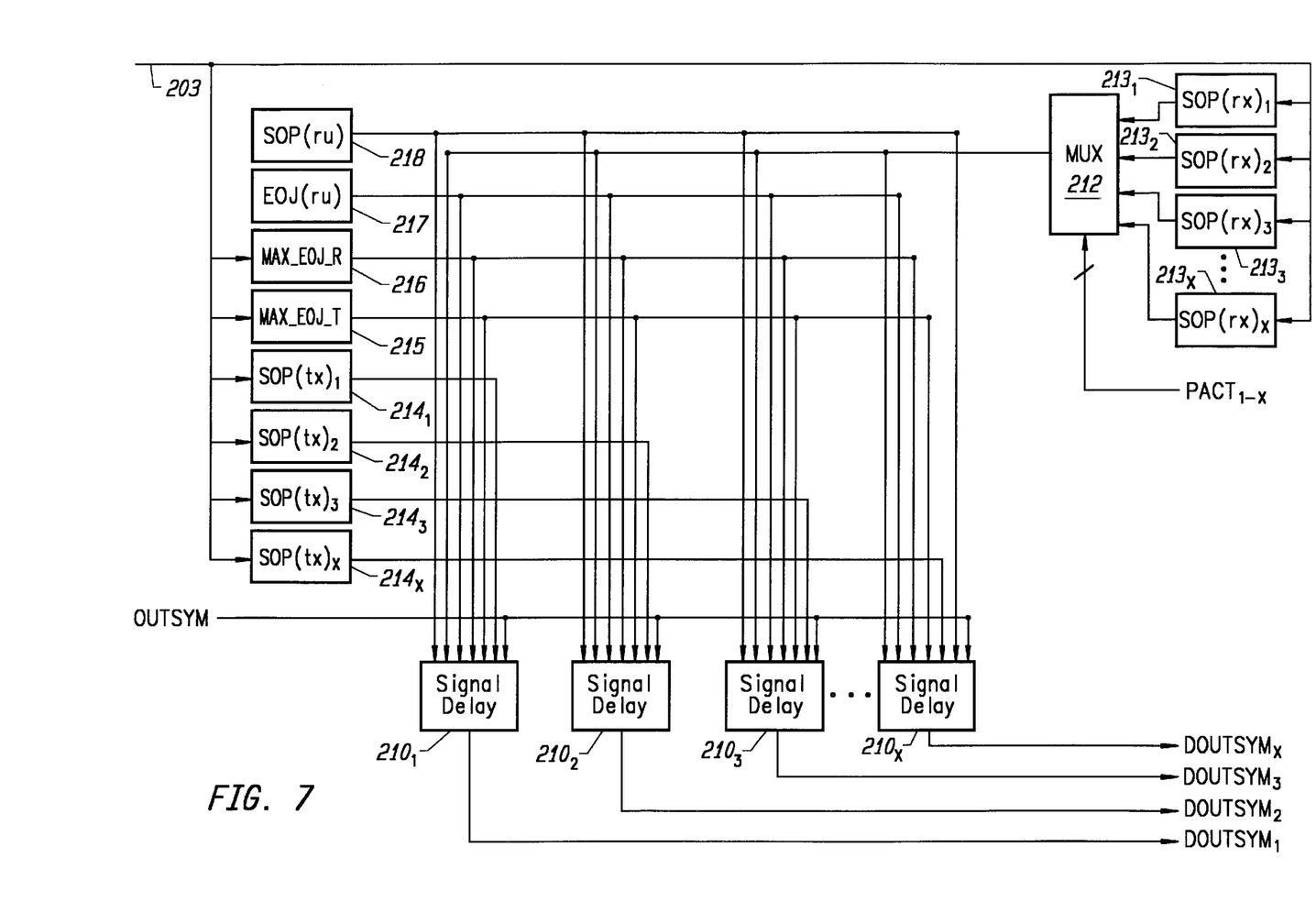
FIG. 7 illustrates one embodiment of the delay balancing circuit shown in FIG. 2.

FIG. 7 illustrates one embodiment of the delay balancing circuit 202. The delay balancing circuit 202 includes a signal delay circuit 210$_{1-X}$ for each transmit channel TX$_{1-X}$ of the repeater unit 201. The OUTSYM signal is coupled to each signal delay circuit 210$_{1-X}$. Each signal delay circuit 210$_{1-X}$ has an output that provides a respective delayed OUTSYM signal DOUTSYM$_{1-X}$.

The delay balancing circuit also includes a set of SOP(rx) data storage elements 213$_{1-X}$, a set of SOP(tx) data storage elements 214$_{1-X}$, a MAX_EOJ_R data storage element 216, and a MAX_EOJ_T data storage element 215. Each of these data storage elements has an input coupled to the user interface bus 203 and may be implemented using traditional memory or register circuitry.

Each SOP(rx) data storage element 213$_{1-X}$ may be loaded with a value equal to the a SOP(rx) value of a respective transceiver 102$_{1-X}$ in the repeater set 200. Each SOP(rx) data storage element 213$_{1-X}$ has an output coupled to a respective input of a receive port multiplexer 212. An output of the receive port multiplexer 212 is coupled to each of the signal delay circuits 210$_{1-X}$.

The receive port multiplexer also has a set of select inputs. Each of the receive port multiplexer's select inputs is coupled to an output PACT$_{1-X}$ of a respective port active state machine. When an output PACT$_{1-X}$ of one of the port active state machines is asserted, the output of a corresponding one of the SOP(rx) data storage elements 213$_{1-X}$ is provided on the output of the receive port multiplexer 212.

Each SOP(tx) data storage element 214$_{1-X}$ may be loaded with a value equal to a SOP(tx) value of a respective transceiver 102$_{1-X}$ in the repeater set 200. An output of each SOP(tx) data storage element is coupled to a respective one of the signal delay circuits 210$_{1-X}$.

The MAX_EOJ_R data storage element 216 is loaded with a value equal to or larger than the largest EOJ(rx) value possessed by any of the transceivers 102$_{1-X}$. The MAX_EOJ_T data storage element 215 is loaded with a value equal to or larger than the largest EOJ(tx) value possessed by any of the transceivers 102$_{1-X}$. Both the MAX_EOJ_R data storage element 216 and the MAX_EOJ_T data storage element 215 have an output coupled to each of the signal delay circuits 210$_{1-X}$.

The delay balancing circuit also includes an SOP(ru) data storage element 218 and an EOJ(ru) data storage element 217. In one embodiment of the present invention, these data storage elements 217, 218 may not be coupled to the user interface bus 203. In an alternate embodiment of the present invention, data storage elements 217 and 218 may be coupled to the user interface bus 203. In either case, data storage elements 217 and 218 may be implemented using traditional memory or register circuits.

The SOP(ru) data storage element 218 is loaded with a value equal to the SOP(ru) for the repeater unit 201. The EOJ(ru) data storage element is loaded with a value equal to the EOJ(ru) for the repeater unit 201. Both the SOP(ru) data storage element 218 and the EOJ(ru) data storage element 217 have an output coupled to each of the signal delay circuits 210$_{1-X}$.

Figure 8:
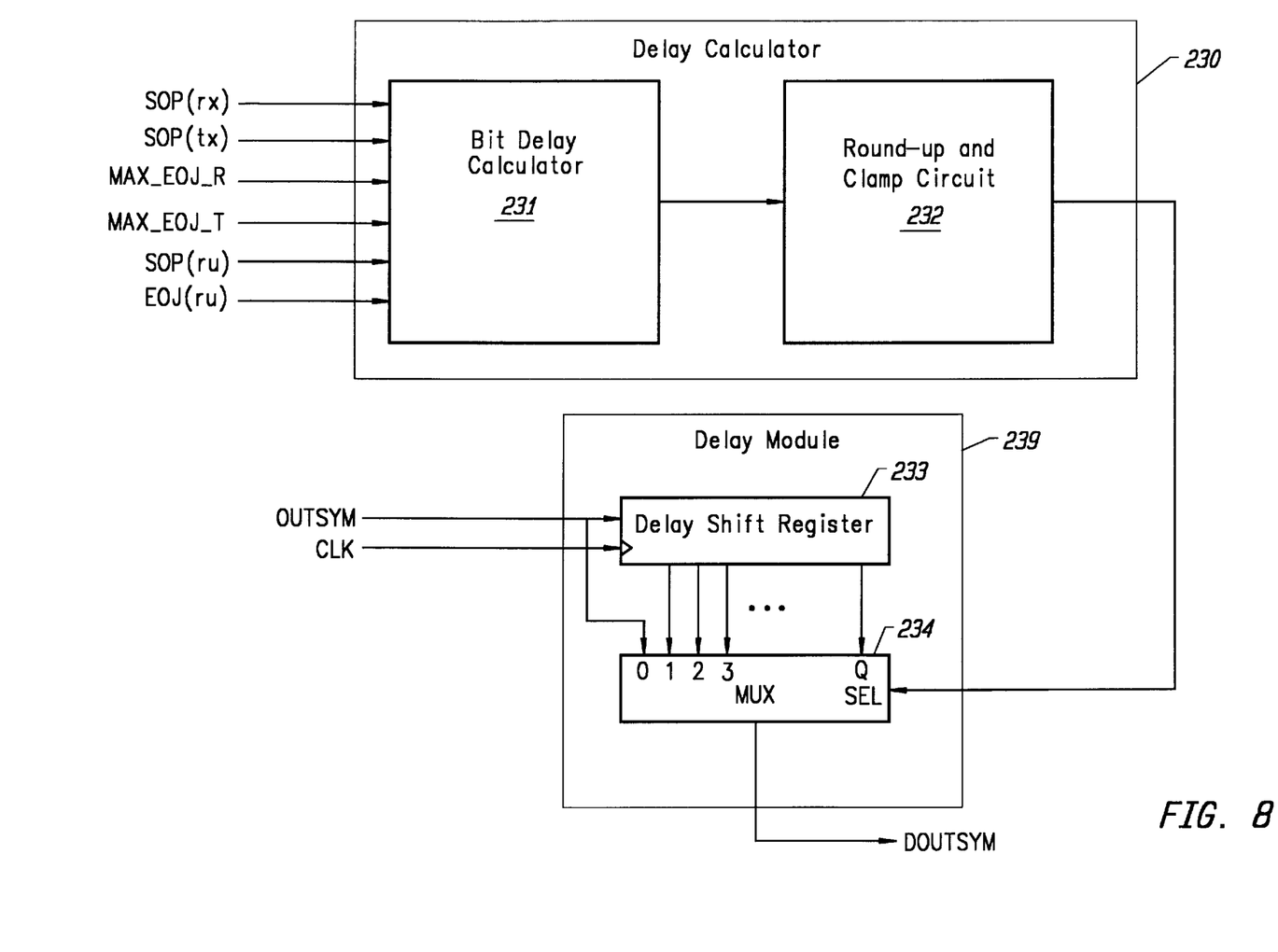
FIG. 8 illustrates circuitry for one of the signal delay circuits shown in FIG. 7.

FIG. 8 illustrates circuitry for one of the signal delay circuits 210$_{1-X}$. The signal delay circuit 210 includes a delay module 239 for delaying the OUTSYM signal and a delay calculator 230 for calculating a character delay value. The delay module 239 includes a delay shift register 233 having a set of data inputs coupled to receive the OUTSYM signal provided by the repeater unit 201. The shift register's input includes at least as many bits as are included in the OUTSYM signal. In one embodiment of the present invention, OUTSYM includes 5 bits.

The data shift register 233 also includes a clock input for signaling that the data at the input of the shift register 233 should be shifted into the shift register. The shift register's clock input may coupled to a clock used for shifting OUTSYM signals out of the FIFO memory. This clock may be a transmit clock. In one embodiment of the present invention, the clock has a period equal to a character time, and a frequency of 25 MHz.

The shift register 233 is Q number of bits deep and includes Q number of outputs. Each one of the shift register's outputs includes the same number of bits as the input to the delay shift register 233. Each one of the Q number of outputs is coupled to a respective input of a delay multiplexer 234, which is also included in the delay module 239.

The delay multiplexer 234 includes Q+1 inputs. One of these inputs is connected to the input of the delay shift register 233 to receive a real time version of OUTSYM. Each input of the delay multiplexer 234 includes at least as many bits as the input shift register 233.

The delay multiplexer 234 includes an output, which forms a respective one of the sets of delayed OUTSYM signals DOUTSYM. The delay multiplexer 234 also includes a select input, which is coupled to an output of the delay calculator 230. The output of the delay calculator 230 provides the character delay value for the port that is coupled to the signal delay circuit 210. The delay multiplexer 234 selects the input that is indicated by the character delay value and provides this input on the delay multiplexer 234 output.

For example, if the delay calculator 230 output provides a value of Q, the delay multiplexer selects its Q input, which is coupled to the delay shift register's Q output. As a result, the output of the delay multiplexer provides the DOUTSYM output with an OUTSYM signal that has been delayed in the shift register 233 for a period of Q number of shift register clock cycles.

The delay calculator 230 has a set of inputs for receiving the outputs of the following: the output of a respective one of the SOP(tx) data storage elements $214_{1-X}$, the output of the receive port multiplexer 212 (SOP(rx)), the output of the SOP(ru) data storage element 218, the output of the EOJ(ru) data storage element 217, the output of the MAX_EOJ_R data storage element 216, and the output of the MAX_EOJ_T data storage element 215. The output of the receive port multiplexer serves as an SOP(rx) value. All of these inputs are then supplied to a bit delay calculator 231, which is in the delay calculator 230.

The bit delay calculator 231 combines these inputs in accordance with Equation 1 to obtain a bit delay value. The bit delay value in then provided on an output of the bit delay calculator, which is coupled to an input of a round-up and clamp circuit 232 in the delay calculator 230.

In one embodiment of the present invention, the round-up and clamp circuit 232 converts the bit delay value into a character delay value in accordance with Equation 2. The character delay value is provided on an output of the round-up and clamp circuit 232, which forms the output of the delay calculator 230. In an alternate embodiment of the present invention, the round-up and clamp circuit 232 converts the bit delay value into a character delay value in accordance with Equation 3.

The B value used by the round-up and clamp circuit 232 is equal to the number of bits used to define a data character in the OUTSYM signal. In the case of an IEEE 802.3u repeater set, B is equal to 4. Although the OUTSYM signal may include 5 bits, this represents a 4 bit character encoded into a 5 bit data and control bit pattern. Further, the Q value may be equal to the number of outputs on the delay shift register 233.

One with ordinary skill in the art will recognize that many different circuits may be designed to perform the operations of the bit delay calculator 231 and the round-up and clamp circuit 232 using traditional logic design principals. In fact, circuits for the bit delay calculator 231 and the round-up and clamp circuit 232 may be designed by employing traditional Verilog design tools and defining the inputs and outputs of these circuits along with the operations they are to perform in accordance with Equation 1 and either Equation 2 or Equation 3.

Figure 9:
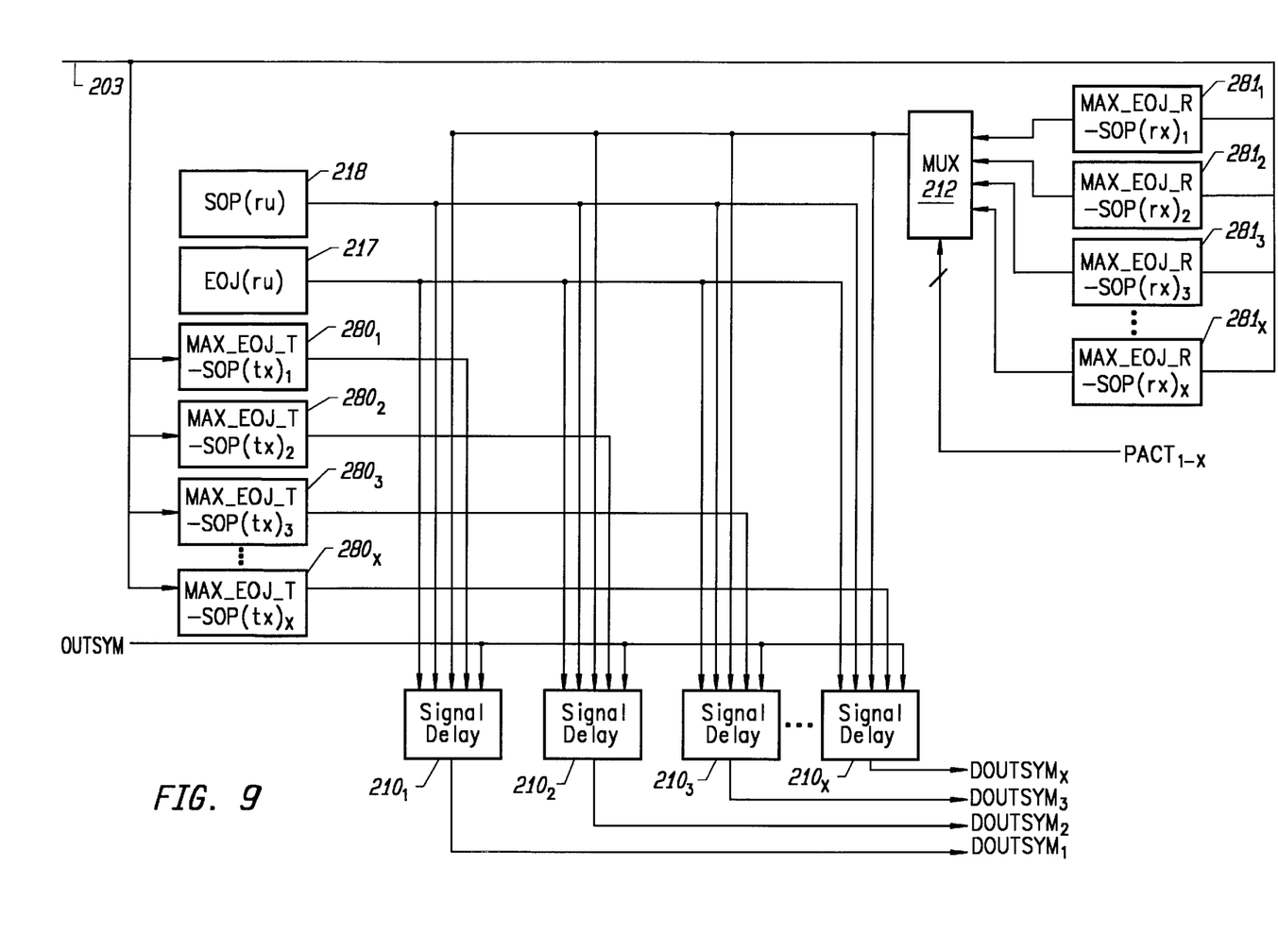
FIG. 9 illustrates an alternate embodiment of the delay balancing circuit shown in FIG. 2.

FIG. 9 shows an alternate embodiment of the delay balancing circuit 202 that eliminates some of the data storage elements. The MAX_EOJ_R data storage element 216 and the MAX_EOJ_T data storage element 215 may be deleted. Each one of the SOP(tx) data storage elements $214_{1-X}$ is replaced by a MAX_EOJ_T-SOP(tx) data storage element $280_{1-X}$. Each MAX_EOJ_T-SOP(tx) data storage element $280_{1-X}$ may be programmed to contain a value equal to the MAX_EOJ_T value minus the SOP(tx) value for a respective one of the transceivers $102_{1-X}$.

Each one of the SOP(rx) data storage elements $213_{1-X}$ is replaced by a MAX_EOJ_R-SOP(rx) data storage element $281_{1-X}$. Each MAX_EOJ_R-SOP(rx) data storage element $281_{1-X}$ may be programmed to contain a value equal to the MAX_EOJ_R value minus the SOP(rx) value for a respective one of the transceivers $102_{1-X}$.

Figure 10:
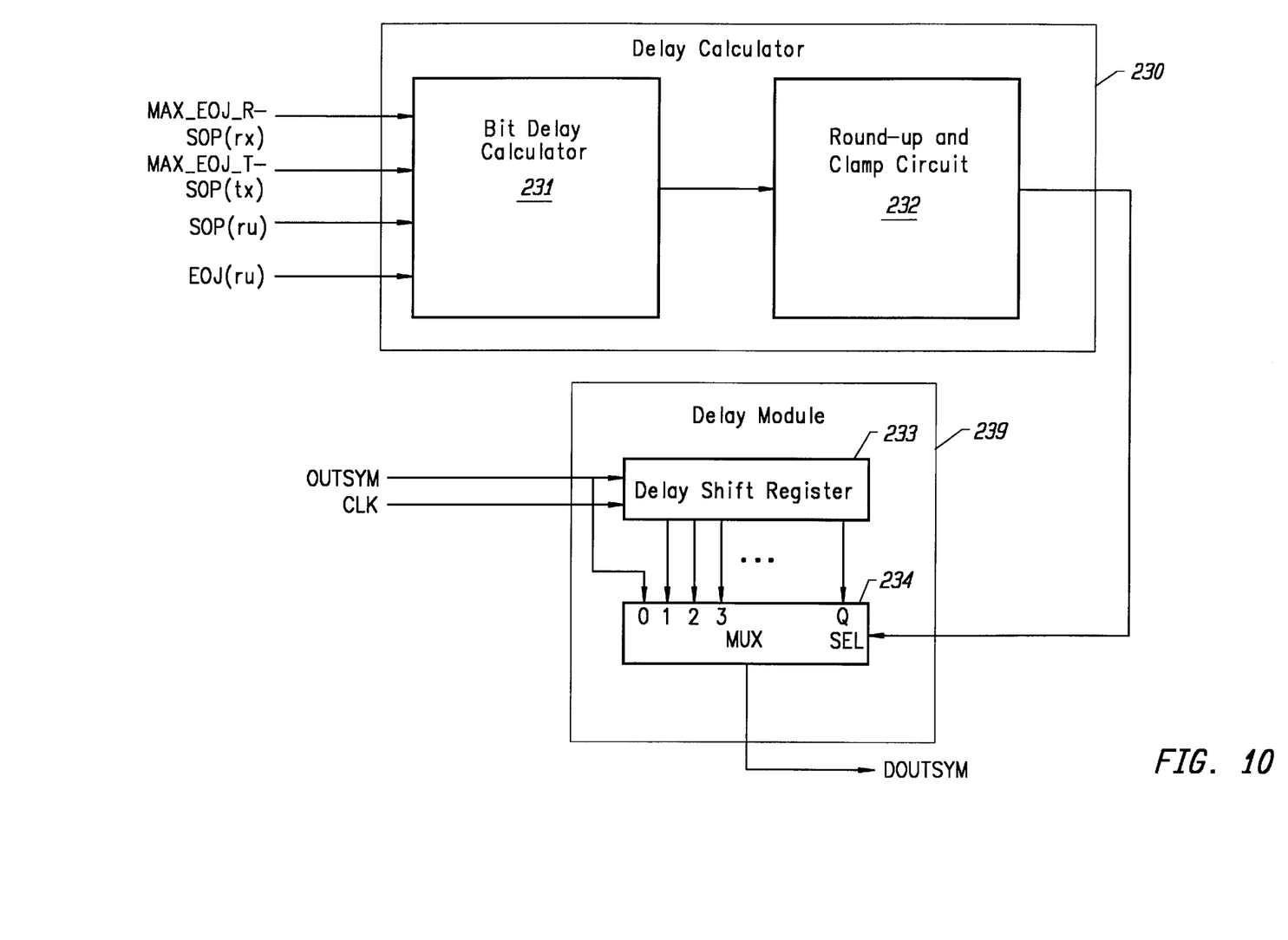
FIG. 10 illustrates circuitry for one of the signal delay circuits shown in FIG. 9.

FIG. 10 illustrates circuitry for one of the signal delay circuits $210_{1-X}$ in the delay balancing circuit 202 shown in FIG. 9. The signal delay circuit shown in FIG. 10 is the same as the circuit shown in FIG. 8, with the following exceptions. The inputs to the delay calculator 230 for receiving the outputs of the MAX_EOJ_T data storage element 215 and MAX_EOJ_R data storage element 216 are deleted. The input for receiving the output of the SOP(tx) data storage element 214 is replaced with an input for receiving the output of the MAX_EOJ_T-SOP(tx) data storage element 280. The output of the receive port multiplexer 212 provides a MAX_EOJ_R-SOP(rx) value to the delay calculator 230.

In accordance with the present invention, any number of the transceivers $102_{1-X}$ may reside on an integrated circuit along with the repeater unit 201 and delay balancing circuit 202. Typically, the SOP(rx) for transceivers that are formed on the same integrated circuit as substantially the same. Similarly, the SOP(tx) for transceivers that are formed on the same integrated circuit are substantially the same. Accordingly, a single SOP(tx) value and a single SOP(rx) value may be used for transceivers that are formed on the same integrated circuit.

By employing a single SOP(rx) value and single SOP(tx) value for multiple transceivers, the number of SOP(tx) data storage elements and SOP(rx) data storage elements may be reduced. A single SOP(tx) data storage element and SOP(rx) data storage element may be employed for each transceiver that is formed on the same integrated circuit.

Since a single set of SOP(tx) and SOP(rx) data storage elements may be employed for the transceivers on the same integrated circuit, a single signal delay circuit may be used to calculate and apply a single character delay for the OUTSYM signals of the integrated transceivers. In such an embodiment, a signal delay circuit would receive a single SOP(tx) value for all of the integrated transceivers. The signal delay circuit for the integrated transceivers provides the same delayed OUTSYM signal DOUTSYM to the port interfaces for each of the integrated transceivers.

Additionally, the single SOP(rx) value for all of the integrated transceivers would be applied to a single input of the receive port multiplexer 212. This SOP(rx) value would be applied to all of the signal delay circuits $210_{1-X}$ when any one of the integrated transceivers is providing data to the repeater unit 201. Since the SOP(rx) and SOP(tx) values for the integrated transceivers are known by the integrated circuit's manufacturer, the data storage elements for the integrated transceivers' SOP(tx) and SOP(rx) values can be loaded during the manufacture of the integrated circuit. This avoids the need for coupling the SOP(rx) and SOP(tx) data storage elements for the integrated transceivers to the user interface bus.

Similarly, the MAX_EOJ_T-SOP(tx) values are substantially the same for a set of integrated transceivers, and the MAX_EOJ_R-SOP(rx) values are substantially the same for a set of integrated transceivers. In embodiments of the present invention that employ these values and include integrated transceivers, the same design alterations may be achieved in the same manner as described above for the embodiments employing SOP(tx) and SOP(rx) values.

Accordingly, circuitry in the repeater set may be reduced, by sharing data storage elements and signal delay elements among several ports that have integrated transceivers. Such a reduction in circuitry may enable the cost of manufacturing the repeater set to be reduced.

Although the present invention has been described with reference to a repeater set 200 in conformance with the IEEE 802.3u Standard, one with ordinary skill in the art will recognize that the present invention is applicable to repeater sets and other types of data controllers that are not within the scope of the IEEE 802.3u Standard. In particular, embodiments of the present invention may be employed for delaying characters that include other than four data bits and are transmitted at frequencies of other than 100 Megabits per second.

Although the invention has been described above with particularity, this was merely to teach one of ordinary skill in the art to make and use the invention. Many modifications will fall within the scope of the invention, as that scope is defined by the following claims.

What is claimed is:

1. A method for delaying a character in a repeater set, wherein said repeater set includes a repeater unit being coupled to a plurality of transceivers, wherein each one of said plurality of transceivers includes a receive channel being coupled to the repeater unit and a transmit channel being coupled to the repeater unit, said method comprising the steps of:

(a) receiving said character, wherein said character is to be provided to a transmit channel of a transceiver in said plurality of transceivers;

(b) calculating a non-randomized character delay value for said character, in response to receiving said character; and (c) delaying said character in said repeater set for a period of time equal to said character delay value to cause a start-of-packet propagation delay (SOP) value for a port of said repeater set to not be less than a cessation-of-collision JAM propagation delay (EOJ) value for said port.

2. The method of claim 1, wherein said step (b) includes calculating a bit delay value using the following equation:

$$BDV=MAX\_EOJ\_R-SOP(rx)+MAX\_EOJ\_T-SOP(tx)+EOJ(ru)-SOP(ru) \text{ if } MAX\_EOJ\_R-SOP(rx)+MAX\_EOJ\_T-SOP(tx)+EOJ(ru)-SOP(ru) \text{ is greater than 0, else BDV=0}$$

wherein:

BDV is said bit delay value,

MAX_EOJ_R is a value equal to or greater than a largest cessation-of-collision JAM propagation delay (EOJ) value from a receive channel of a transceiver (EOJ(rx)) in said plurality of transceivers that is providing information to the repeater unit, SOP(rx) is a value equal to a start-of-packet propagation delay (SOP) value of a receive channel of a transceiver in said plurality of transceivers that is providing information to the repeater unit, MAX_EOJ_T is a value equal to or greater than a largest EOJ value provided from a transmit channel (EOJ(tx)) of any of said plurality of transceivers, SOP(tx) is a SOP value of a transmit channel of one of the plurality of transceivers, EOJ(ru) is an EOJ value for the repeater unit, and SOP(ru) is an SOP value for the repeater unit.

3. The method of claim 1, wherein said character being delayed in said step (c) is provided to at least two transceivers in the plurality of transceivers after being delayed.

4. The method of claim 1 wherein said step (a) includes the steps of:

asserting a port active signal while data for the character is being received by a transceiver in the plurality of transceivers; and maintaining the assertion of said port active signal until a delay time after the data for the character is no longer being received by said transceiver.

5. The method of claim 4, wherein said delay time is equal to or greater than said character delay value.

6. A repeater set including a repeater unit coupled to a plurality of transceivers, each one of said plurality of transceivers having a receive channel coupled to said repeater unit and a transmit channel coupled to said repeater unit, said repeater set comprising:

a delay calculator for determining a non-randomized character delay value, said delay calculator having an output for providing said character delay value; and a delay module having a data input coupled to said repeater unit to receive a character to be delayed, a delay input coupled to said output of said delay calculator and an output for providing a delayed version of said character in said repeater set, said delay module delaying said character received from said repeater unit in response to said character delay value such that a start-of-racket propagation delay (SOP) value for a port of said repeater set is not less than a cessation-of-collision JAM propagation delay (EOJ) value for said port.

7. The repeater set of claim 6, wherein said delay module includes:

a shift register having an input forming said data input of said delay module, said shift register having a plurality of outputs; and a multiplexer having a plurality of data inputs, a select input forming said delay input, and an output forming said output of said delay module, wherein at least one of said plurality of data inputs is coupled to a respective one of said plurality of outputs of said shift register.

8. The repeater set of claim 6, wherein said delay calculator includes a bit delay calculator for calculating a bit delay value in accordance with the following equation:

$$BDV=MAX\_EOJ\_R-SOP(rx)+MAX\_EOJ\_T-SOP(tx)+EOJ(ru)-SOP(ru) \text{ if } MAX\_EOJ\_R-SOP(rx)+MAX\_EOJ\_T-SOP(tx)+EOJ(ru)-SOP(ru) \text{ is greater than 0, else BDV=0}$$

wherein:

BDV is said bit delay value,

MAX_EOJ_R is a value equal to or greater than a largest cessation-of-collision JAM propagation delay (EOJ) value from a receive channel (EOJ(rx)) of a transceiver in said plurality of transceivers that is pro viding information to the repeater unit, SOP(rx) is a value equal to a start-of-packet propagation delay (SOP) value of a receive channel of a transceiver in said plurality of transceivers that is providing information to the repeater unit, MAX_EOJ_T is a value equal to or greater than a largest EOJ value provided from a transmit channel (EOJ(tx)) of any of said plurality of transceivers, SOP(tx) is a SOP value of a transmit channel of one of the plurality of transceivers, EOJ(ru) is an EOJ value for the repeater unit, and SOP(ru) is an SOP value for the repeater unit.

9. The repeater set of claim 8, wherein said delay calculator further includes a round-up and clamp circuit having an input coupled to an output of said bit delay calculator to receive said bit delay value, and an output coupled to said delay input, wherein said round-up and clamp circuit converts said bit delay value into said character delay value and provides said character delay value on said output of said round-up and clamp circuit.

10. The repeater set of claim 6, further including:
   means for asserting a port active signal while data is being received by a transceiver in said plurality of transceivers; and
   means for maintaining the assertion of said port active signal until a delay time after data is no longer received by said transceiver.

11. The repeater set of claim 10, wherein said delay time is equal to or greater than sid character delay value.

12. The repeater set of claim 6, wherein said output of said delay module is coupled to at least two transceivers in said plurality of transceivers.

13. The repeater set as called for in claim 6, further including:
   a set of data storage elements having outputs coupled to said delay calculator.

14. The repeater set as called for in claim 13, further including:
   a user interface bus coupled to inputs of a portion of data storage elements in said set of data storage elements, for providing data to said data storage elements.

15. The method of claim 2, wherein said step (b) further includes the step of:
   converting the bit delay value into said character delay value using the following equation:

$$CDV=INT(BDV/B), \text{ if } INT(BDV/B) \text{ is less than or equal to Q, else } CDV=Q.$$

wherein:
   CDV is said character delay value;
   B is a number of bits in said character,
   INT(BDV/B) is equal to a quotient of BDV divided by B, if the quotient is an integer, else INT(BDV/B) is equal to an integer portion of the quotient plus 1, and
   Q is a maximum allowable number of delay periods.

16. The method of claim 2, wherein said step (b) further includes the step of:
   converting the bit delay value into said character delay value using the following equation:

$$CDV=INT(BDV/B)$$

wherein:
   CDV is said character delay value,
   B is a number of bits in said character, and
   INT(BDV/B) is equal to a quotient of BDV divided by B, if the quotient is an integer, else INT(BDV/B) is equal to an integer portion of the quotient plus 1.

17. The repeater set of claim 9, wherein said round-up and clamp circuit converts said bit delay value into said character delay value in accordance with the following equation:

$$CDV=INT(BDV/B), \text{ if } INT(BDV/B) \text{ is less than or equal to Q, else } CDV=Q.$$

wherein:
   CDV is said character delay value;
   B is a number of bits in said character,
   INT(BDV/B) is equal to a quotient of BDV divided by B, if the quotient is an integer, else INT(BDV/B) is equal to an integer portion of the quotient plus 1, and
   Q is a maximum allowable number of delay periods.

18. The repeater set of claim 9, wherein said round-up and clamp circuit converts said bit delay value into said character delay value in accordance with the following equation:

$$CDV=INT(BDV/B),$$

wherein:
   CDV is said character delay value;
   B is a number of bits in said character, and
   INT(BDV/B) is equal to a quotient of BDV divided by B, if the quotient is an integer, else INT(BDV/B) is equal to an integer portion of the quotient plus 1.

* * * * *

UNITED STATES PATENT AND TRADEMARK OFFICE
CERTIFICATE OF CORRECTION

PATENT NO. : 6,118,809
DATED : September 12, 2000
INVENTOR(S) : William Lo It is certified that error appears in the above-identified patent and that said Letters Patent is hereby corrected as shown below:

In Column 17, Claim 11, line 9, delete "sid" and insert --said-- therefor.

Signed and Sealed this

Fifteenth Day of May, 2001

Attest:

NICHOLAS P. GODICI

Attesting Officer      Acting Director of the United States Patent and Trademark Office